E. WHEELER.
Manufacture of Iron and Steel from Scraps.

No. 149,818. Patented April 14, 1874.

UNITED STATES PATENT OFFICE.

ELBRIDGE WHEELER, OF PHILADELPHIA, PENNSYLVANIA.

IMPROVEMENT IN THE MANUFACTURE OF IRON AND STEEL FROM SCRAPS.

Specification forming part of Letters Patent No. 149,818, dated April 14, 1874; application filed March 10, 1874.

*To all whom it may concern:*

Figure 1:
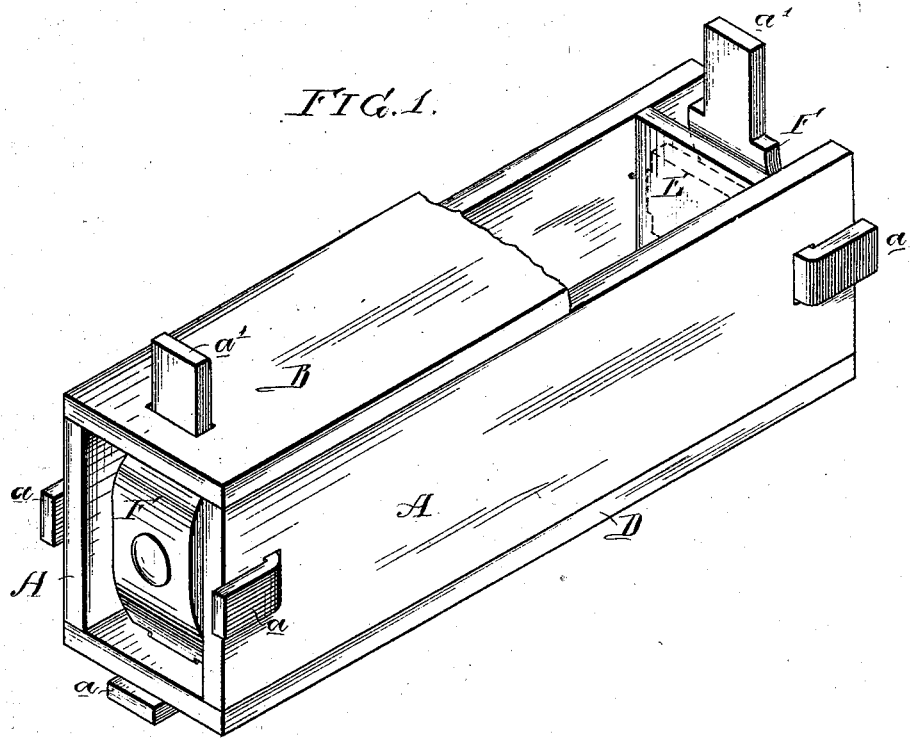
Figure 2:
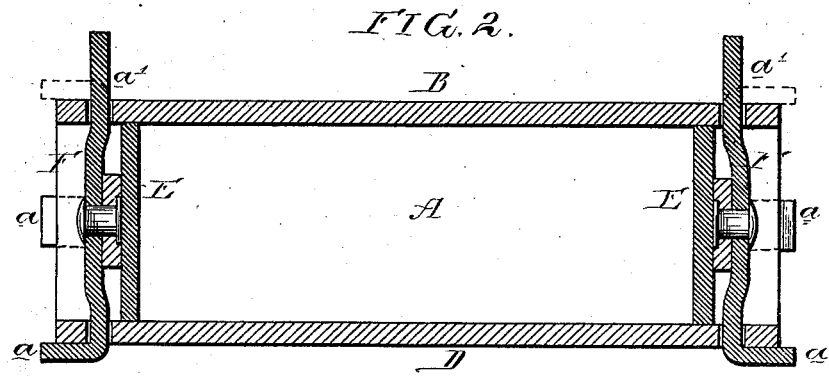

Be it known that I, ELBRIDGE WHEELER, of Philadelphia, Pennsylvania, have invented a Case or Crucible for Scrap Iron or Steel, of which the following is a specification:

The object of my invention is to facilitate the transportation of scrap iron or steel from distant points to a furnace, and the heating of the said scrap without deterioration preparatory to its reduction by rolls into merchantable bars, an object which I attain by packing the said scrap iron or steel into a rectangular case or crucible, composed of overlapping plates, united as shown in the perspective view, Figure 1, and longitudinal section, Fig. 2, of the accompanying drawing.

The case or crucible consists of opposite side plates A A, a top plate, B. bottom plate D, and end plates E E, the whole being united by crossed bars F F, the ends *a* of which, after having been passed through slots formed in the top, bottom, and side plates, are bent, as shown, so as to secure the same firmly together. The side plates are overlapped by the top and bottom plates, and the end plates by the whole of the longitudinal plates, for a purpose explained hereafter. In constructing the case, the side plates A A are placed in their proper positions upon the bottom plate D, to which they are secured by the crossed bars F, thus forming a complete box, without a lid, which will bear rough handling and transportation to any distant point to be filled with scrap iron or steel. The latter being packed into the box after introducing the end plates E, and being retained therein by the top or cover-plate B which is in turn secured by bending down the projecting ends *a'* of the crossed bars F.

The box or case thus filled can be conveyed to distant points much more conveniently and economically than loose scrap, or it can be introduced at once into the furnace; and as comparatively tight joints are obtained by overlapping the plate in the manner above described, the scrap can be subjected to any desired degree of heat without deterioration, and when withdrawn from the furnace the case and its contents can be at once subjected to the action of reducing-rolls for conversion into merchantable bars.

In carrying out my invention, the connecting-bars F may be made of two pieces crossed and riveted together, as shown in Figs. 1 and 2, or they may each consist of a single plate having projections adapted to the slots in the top, bottom, and side plates.

I propose in some instances to make the bars or plates F of sufficient width to close the ends of the case, in which event the end plates E may be dispensed with.

I claim as my invention—

The within-described case or crucible for scrap iron or steel, consisting of overlapping plates A, A, B, and D, slotted at or near their opposite ends, and united by crossed bars or plates F, having bent projections *a* adapted to the said slotted ends.

In testimony whereof I have signed my name to this specification in the presence of two subscribing witnesses.

ELBRIDGE WHEELER.

Witnesses:
WM. A. STEEL,
HARRY SMITH.